United States Patent Office 2,888,478
Patented May 26, 1959

2,888,478
PREPARATION OF PHENYL ALKYLCHLOROSILANES

Bruce A. Ashby, Schenectady, N.Y., assignor to General Electric Company, a corporation of New York No Drawing. Application September 9, 1957
Serial No. 682,595

9 Claims. (Cl. 260—448.2)

This invention is concerned with a process for the preparation of phenylalkylchlorosilanes. More particularly the invention relates to a process which comprises effecting reaction at elevated temperatures in the presence of zirconium tetrachloride as a catalyst between (1) a preformed compound corresponding to the general formula I
$$(C_6H_5)_m \overset{R_n}{\underset{|}{Si}} - Cl_{4-m-n}$$

and (2) a preformed compound corresponding to the general formula

II
$$R'_p Si\ Cl_{4-p}$$

where R and R' are alkyl radicals, $m$ is an integer equal to from 2 to 4, inclusive, $n$ is an integer equal to from 0 to 1, the sum of $m+n$ being at most 4, and $p$ is an integer equal from 1 to 2, inclusive.

One of the objects of this invention is to enable one to prepare in a relatively easy manner organochlorosilanes containing both phenyl groups and alkyl groups substituted directly on the silicon atom.

Another object of the invention is to prepare phenylalkylchlorosilanes from phenylchlorosilanes and alkylchlorosilanes in good yields without the formation of undue amounts of organochlorosilanes which are difficultly separable from the formed phenylalkylchlorosilanes, for instance, other phenylchlorosilanes.

A further object of this invention is to effect an interchange of both phenyl groups and chlorine atoms attached to silicon so as to obtain phenylalkylchlorosilanes.

Other objects of the invention will become more apparent from the description of the invention which follows:

In U.S. Patents 2,730,540 and 2,647,136, both patents being assigned to the same assignee as the present invention, there are disclosed redistribution reactions involving the reaction of phenylchlorosilanes with alkylchlorosilanes in the presence of aluminum chloride to obtain phenylalkylchlorosilanes. It has been found that when using aluminum chloride as the redistribution catalyst in such reactions, one obtains large amounts of phenyltrichlorosilane or phenyldialkylchlorosilane, e.g., phenyldimethylchlorosilane which, because they have boiling points close to the boiling point of the more desirable phenylalkyldichlorosilane, e.g., phenylmethyldichlorosilane, renders it difficult and expensive to isolate the more desirable phenylalkyldichlorosilane, e.g., phenylmethyldichlorosilane. The amounts of these phenyltrichlorosilane or phenylidalkylchlorosilane contaminants may range from 20 to 25 percent of the yield of phenylalkyldichlorosilane obtained.

Unexpectedly I have discovered that a specific catalyst, namely, zirconium tetrachloride, when employed in the above-described redistribution reaction not only gives relatively fast conversion of the organchlorosilanes to the desired redistributed phenyl alkylchlorosilane, but in addition undesirable contaminants such as the aforesaid phenyltrichlorosilane or phenyl dialkylchlorosilane are obtained in relatively low amounts and often are absent from the redistributed product. The use of the zirconium tetrachloride is additionally superior to the use of aluminum chloride in the above reaction in that whereas aluminum chloride effects interchange of both phenyl groups and methyl groups with chlorine, the zirconium chloride selectively causes interchange of only phenyl groups with chlorine atoms.

In addition, it has been found that when aluminum chloride has been employed in redistribution reactions, it has been necessary to use a complexing agent after the redistribution reaction has taken place to form a complex with the aluminum chloride in order that the reaction product may satisfactorily be fractionally distilled to isolate the desired chlorosilanes. Unless the aluminum chloride is complexed and inactivated, for instance, with sodium chloride, the aluminum chloride causes extensive cleavage of the phenyl groups attached to silicon, thus resulting in losses of valuable products and by-products. The use of the zirconium tetrachloride as the catalytic agent obviates the necessity of using a complexing agent since the zirconium tetrachloride exerts no apparent effect as far as cleavage of phenyl groups from silicon is concerned. In this respect the use of zirconium tetrachloride constitutes a material advantage in processing technique over that required when using aluminum chloride as a redistribution catalyst.

Among the radicals which R and R' may be are, for instance, methyl, ethyl, propyl, isopropyl, butyl, amyl, decyl, dodecyl, etc. Preferably, R and R' are the methyl and ethyl radicals. Included among the phenylchlorosilanes (Formula I) which may be employed in the above-described redistribution reaction are, for instance, diphenyldichlorosilane, triphenylchlorosilane, diphenyl methylchlorosilane, diphenyl ethylchlorosilane, etc. Included among the alkyl chlorosilanes (Formula II) which may be employed are, for instance, methyltrichlorosilane, ethyltrichlorosilane, dimethyldichlorosilane, diethyldichlorosilane, methylethyldichlorosilane, amyltrichlorosilane, etc.

The amount of zirconium tetrachloride which may be employed may be varied widely. Generally, I prefer to use from about 0.01 to 10%, by weight, of the zirconium tetrachloride based on the total weight of the mixture of chlorosilanes used. Higher amounts, e.g., up to 20%, may be used, but no advantage is derived therefrom.

The manner whereby my process may be practiced may be varied within wide limits. Although the reaction may, under some conditions, be effected at atmospheric pressures, I prefer to use super-atmospheric pressures in order to effect a more intimate contact between the various molecules. Pressures of the order of about 100 p.s.i. to 750 p.s.i. (or higher if desired) are advantageously employed.

The temperature at which the reaction is caused to proceed may also be varied depending upon such factors as, for example, the particular chlorosilanes employed, the time of reaction, the presence or absence of pressure, etc. I have found that good results are obtained even when temperatures are as low as 125° C., although I advantageously may use temperatures from about 150° C. to 500° C. Temperatures above 500° C. may be employed provided shorter reaction times are used to minimize undesirable losses due to side reactions.

The time for effecting reaction may obviously be varied within wide limits depending on the temperature employed, the pressure employed, the concentration of the catalyst, namely, zirconium tetrachloride, etc. At temperatures of the order of 150° to 400° C. in the presence of the zirconium tetrachloride, the claimed reaction proceeds substantially to completion in from 4 to 15 hours.

Where normal pressures are employed in conducting the reaction, the reactant or reactants are advantageously passed through a hot tube heated at the required temperatures. The zirconium tetrachloride catalyst may be suitably employed within the tube in a manner so as to permit passage of the mixture of phenyl and alkylsilanes while contacting the catalyst. The use of inert, solid supports (e.g., alumina, etc.) for the zirconium tetrachloride is not precluded.

The use of pressure equipment is preferable for conducting my reaction to give more intimate contact between the coreacting molecules. Under such conditions, heating of the pressure equipment at the required temperature may cause the internal pressure to vary anywhere from 250 p.s.i. to 2000 or even 3000 p.s.i. The use of superatmospheric pressure also permits lower temperatures of reaction at slightly longer periods of time with the attendant advantage that undesirable side reactions are minimized.

In employing the mixture of the phenylsilane (Formula I) and the alkylchlorosilane (Formula II) more particularly defined above, the proportion of these reactants may be varied within broad limits. The actual proportion of ingredients will depend upon such factors as the starting materials used, the desired product, etc. Generally, it is desirable to employ the alkylchlorosilane in a molar excess over the phenylchlorosilane, e.g., from 1.1 to 3 moles of the former per mole of the latter. However, this does not preclude the use of other proportions wherein either the phenylchlorosilane or the alkylchlorosilane may be in molar excess. Since the phenylsilane reactant and reaction product are more expensive than the alkylchlorosilane, it is desirable to use the latter in a molar excess.

In addition to using the zirconium tetrachloride as a catalyst for the reaction, I have also found that the presence of small amounts of monomeric silanes containing silicon-bonded hydrogen, for instance, alkyl hydrogen chlorosilanes, for instance, methyl dichlorosilane ($CH_3SiHCl_2$), phenyl dichlorosilane ($C_6H_5SiHCl_2$), etc., greatly facilitate the reaction resulting in more rapid conversion to the desired redistributed product. The use of catalytic amounts of a compound containing an Si—H grouping to facilitate the redistribution reaction is more particularly disclosed and claimed in McEntee Patent 2,786,861, issued March 26, 1957, and assigned to the same assignee as the present invention.

In order that those skilled in the art may better understand how the present invention may be practiced, the following examples are given by way of illustration and not by way of limitation. All parts are by weight.

In the following examples, unless stated otherwise, the pressure equipment (or autoclave) employed was a three-liter steel bomb which was provided with suitable arrangements whereby the bomb, together with its contents, could be uniformly heated at elevated temperatures. In the following examples, anhydrous conditions were maintained throughout the reaction and after distillation in order to avoid any loss of reaction product due to hydrolysis of silicon-bonded chlorine to polysiloxane linkages. Agitation of the reacting mass was provided in each instance.

EXAMPLE 1

About 33 parts triphenylmethylsilane and 37 parts of methyltrichlorosilane were charged with 7 parts of zirconium tetrachloride to an autoclave and the latter closed and heated at 200° C. for 16 hours. That portion of the reaction mixture converted to phenylmethyldichlorosilane contained only about 9%, by weight, of phenyldimethylchlorosilane, which was all of the phenyldimethylchlorosilane formed in the reaction.

EXAMPLE 2

In this example, about 66 parts (0.242 mole) triphenylmethylsilane and about 75 parts (0.502 mole) methyl trichlorosilane were charged with 14 grams of zirconium tetrachloride and 7.8 grams of methyldichlorosilane (as a promoter) to an autoclave and the latter heated for 16 hours at 150° C. As a result of this reaction, there was obtained a good yield (about 48 parts or 0.25 mole) phenylmethyldichlorosilane; this reaction product contained only about 0.3 percent, by weight, phenyltrichlorosilane and no detectible amount of phenyldimethylchlorosilane was present in the phenylmethyldichlorosilane.

EXAMPLE 3

232.5 parts diphenylmethylchlorosilane, 299 parts methyltrichlorosilane, 26.5 parts zirconium tetrachloride, and 26.5 parts methyldichlorosilane were combined in a 1-liter autoclave and heated at 150° C. for 16 hours with agitation. The contents of the autoclave were distilled to give 203 grams of phenylmethyldichlorosilane. This reaction product contained only 0.28% phenyldimethylchlorosilane as an impurity. The yield of phenylmethyldichlorosilane based on unrecovered methyltrichlorosilane was 77%. When the same reaction was carried out for four hours instead of sixteen hours, essentially the same results were obtained.

EXAMPLE 4

42 parts tetraphenylsilane, 37.5 parts methyltrichlorosilane, 5 parts zirconium tetrachloride and 5 parts methyldichlorosilane were heated at 150° C. for 16 hours with agitation in an autoclave. The contents of the autoclave were distilled to give an 87% yield of phenylmethyldichlorosilane based on unrecovered methyltrichlorosilane. The same redistribution was observed to occur at 250° C. and also to occur even after four hours heating at 150° C. When the ratio of tetraphenylsilane to methyltrichlorosilane was 0.2 (on a molar basis), the yield of phenylmethyldichlorosilane was somewhat lower than when employing the previous ratio of ingredients.

EXAMPLE 5

In this example, various attempts were made to effect the redistribution reaction employing the conditions recited in Examples 1 to 4, between equimolar amounts of various organochlorosilanes employing in one instance zirconium tetrachloride and in another instance aluminum trichloride. This example illustrates graphically the differences in the effect and activity of zirconium tetrachloride as compared to aluminum trichloride and even titanium tetrachloride. The following Table I shows the reactants which were employed in essentially equimolar amounts, the catalyst employed, and the reaction product realized in the event that reaction did take place. Unless otherwise stated, the conditions employed in the following examples were heating the reactants and catalyst in a closed autoclave at 150° C. for four hours.

*Table I*

| Run No. | Reactants | Catalyst | Main Reaction Product |
|---|---|---|---|
| A | $CH_3SiCl_3 + (CH_3)_3SiCl$ | $ZrCl_4$ | No reaction. |
| B | $CH_3SiCl_3 + (CH_3)_3SiCl$ | $AlCl_3$ | $(CH_3)_2SiCl_2$. |
| C | $C_6H_5SiCl_3 + (CH_3)_3SiCl$ | $ZrCl_4$ | No reaction. |
| D | $C_6H_5SiCl_3 + (CH_3)_3SiCl$ | $AlCl_3$ | $(C_6H_5)CH_3SiCl_2$. |
| E [1] | $(C_6H_5)_3SiCH_3 + CH_3SiCl_3$ | $TiCl_4$ | No reaction. |

[1] Reaction was for 16 hours at 150° C.

It will be apparent from the foregoing Table I that contrary to the effects obtained by using aluminum trichloride as a redistribution catalyst, zirconium tetrachloride does not effect redistribution of alkyl groups.

EXAMPLE 6

Tetraphenylsilane and methyltrichlorosilane were reacted in varying proportions with varying amounts of zirconium tetrachloride employing methyldichlorosilane as a promoter. The conditions for the reaction (which was conducted in a 250 ml. autoclave) were in each instance for from 4 to 16 hours and the temperatures varied from about 150 to 250° C. In addition, the ratio of the tetraphenylsilane to the methyltrichlorosilane was varied under the range of from about 1 to 2 to 1 to 5 moles of the former per mole of the latter. The following Table II shows the ingredients used in each of the tests conducted, as well as the proportion of the ingredients and the conditions of the reaction. Table III shows the distribution of the product obtained as the result of the redistribution reaction conducted in each instance.

(that is, an organosilicon composition containing a silicon-bonded hydrogen), in some instances a catalyst only, for instance, aluminum chloride or zirconium tetrachloride, and in still further instances combinations of these catalysts with and without promoters, such as methyldichlorosilane and silicochloroform. The reaction was carried out in essentially the same manner as in the previous examples, employing an autoclave for carrying out the reaction. The conditions of reaction were varied in several of the following examples. The following Table IV shows the molar concentrations of the reactants, the catalysts, and the promoters, as well as the conditions of the reaction. Table V shows the molar concentrations of the desired product, phenylmethyldichlorosilane, as well as

Table IV

| Run No. | Moles $(C_6H_5)_3SiCH_3$ | Moles $CH_3SiCl_3$ | Catalyst | Moles Catalyst | Moles $CH_3SiHCl_2$ | Conditions of Reaction |
|---|---|---|---|---|---|---|
| K | 0.121 | 0.249 | $AlCl_3$ | 0.052 | None | 6.5 hrs./200°C. |
| L | 0.121 | 0.249 | $AlCl_3$ | 0.052 | 0.061 | 5 hrs/150°C. |
| M | 0.121 | 0.249 | $SnCl_4$ | 0.027 | None | 5 hrs./200°C. |
| N | 0.121 | 0.249 | $ZrCl_4$ | 0.030 | None | 18 hrs./200°C. |
| O | 0.242 | 0.486 | $ZrCl_4$ | 0.060 | 0.068 | 16 hrs./160°C. |
| P | 0.242 | 0.466 | None | None | None | 4 hrs./250°C. |
| Q | 0.121 | 0.466 | $ZrCl_4$ | 0.021 | 0.044 | 4 hrs./150°C. |
| R | 0.121 | 0.476 | $ZrCl_4$ | 0.021 | 0.044 | 16 hrs./150°C. |
| S | 0.730 | 2.880 | $ZrCl_4$ | 0.136 | 0.276 | 17 hrs./150°C. |

Table V

| Run No. | Moles $C_6H_5CH_3SiCl_2$ | Moles $C_6H_5(CH_3)_2SiCl$ | Moles $C_6H_5SiCl_3$ | Yield $C_6H_5CH_3SiCl_2$ Based on Unrecovered $CH_3SiCl_3$, percent |
|---|---|---|---|---|
| K | 0.071 | Not determined | 0.016 | 22 |
| L | 0.109 | 0.006 | 0.015 | 34 |
| M | No reaction | | | |
| N | 0.099 | 0.01 | 0.001 | 34 |
| O | 0.249 | 0.003 | 0.002 | 49 |
| P | No reaction | | | |
| Q | 0.162 | 0.006 | None | 70 |
| R | 0.174 | 0.002 | 0.002 | 74 |
| S | 1.050 | 0.017 | 0.006 | 70 |

Table II

| Run No. | Moles $(C_6H_5)_4Si$ | Moles $CH_3SiCl_3$ | Moles $ZrCl_4$ | Moles $CH_3SiHCl_2$ | Conditions of Reaction |
|---|---|---|---|---|---|
| F | 0.193 | 0.380 | 0.043 | 0.021 | 5 hrs./158° C. |
| G | 0.157 | 0.316 | 0.043 | 0.021 | 4 hrs./250° C. |
| H | 0.125 | 0.252 | 0.043 | 0.021 | 16 hrs./150° C. |
| I | 0.092 | 0.460 | 0.043 | 0.021 | 4 hrs./150° C. |
| J | 0.157 | 0.316 | a 0.037 | b 0.037 | 4 hrs./150° C. | a Used $AlCl_3$ instead of $ZrCl_4$.
b Used $HSiCl_3$ instead of $CH_3SiHCl_2$.

the molar concentrations of the less desirable by-products (the amounts of which the present invention is designed to reduce), as well as the yield of phenylmethyldichlorosilane.

EXAMPLE 8

In this example, diphenylmethylchlorosilane was reacted with methyltrichlorosilane in the presence of the zirconium tetrachloride as a catalyst and methyldichlorosilane as a promoter employing varying conditions of reaction. The manner in which the reaction was carried out was similar to that performed in the previous examples wherein an autoclave was charged with the reactants, catalyst and promoter, and heated at the designated temperature. The reaction products were fractionally distilled and analyzed (by mass spectrometer) to

Table III

| Run No. | Moles $C_6H_5CH_3SiCl_2$ | Moles $C_6H_5(CH_3)_2SiCl$ | Moles $C_6H_5SiCl_3$ | Yield $C_6H_5CH_3SiCl_2$ Based On Unrecovered $CH_3SiCl_3$, percent |
|---|---|---|---|---|
| F | 0.088 | None | 0.0016 | 72 |
| G | 0.102 | 0.005 | 0.009 | 46.1 |
| H | 0.067 | 0.0026 | 0.0018 | 87.0 |
| I | 0.011 | 0.0034 | 0.0001 | 20.7 |
| J | 0.0063 | 0.0021 | 0.0005 | 6.0 |

EXAMPLE 7

In this example, triphenylmethylsilance and methyltrichlorosilane were reacted in varying proportions employing in some instances no catalyst and no promoter determine the proportions of phenylmethyldichlorosilane, and the less desirable phenyltrichlorosilane and phenyldimethylchlorosilane. Table VI below shows the molar concentrations of the ingredients used in the reaction and the conditions of reaction, while Table VII shows the moles of phenylmethyldichlorosilane as well as the moles of phenyltrichlorosilane and phenyldimethylchlorosilane obtained in the reaction mixture, together with the yield of phenylmethyldichlorosilane.

Table VI

| Run No. | Moles (C₆H₅)₂CH₃SiCl | Moles CH₃SiCl₃ | Moles ZrCl₄ | Moles CH₃SiHCl₂ | Conditions of Reaction |
|---|---|---|---|---|---|
| T | 0.250 | 0.242 | 0.021 | 0.044 | 4 hrs./150° C. |
| U | 0.200 | 0.793 | 0.036 | 0.072 | 4 hrs./150° C. |
| V | 1.000 | 1.980 | 0.114 | 0.250 | 16 hrs./150° C. |

Table VII

| Run No. | Moles C₆H₅CH₃SiCl₂ | Moles C₆H₅SiCl₃ | Moles C₆H₅(CH₃)₂SiCl | Yield C₆H₅CH₃SiCl₂ Based on Unrecovered CH₃SiCl₃, percent |
|---|---|---|---|---|
| T | 0.208 | Trace | 0.005 | 82 |
| U | 0.183 | None | 0.001 | 76 |
| V | 1.060 | None | 0.003 | 80 |

It will, of course, be apparent to those skilled in the art that other reactants can be employed in place of the organochlorosilanes subjected to redistribution in the foregoing examples. Many examples of such organochlorosilanes capable of redistribution have been given previously. It will also be obvious that varying proportions of ingredients including the materials undergoing redistribution, zirconium tetrachloride, etc., as well as the promoters used may be employed in place of the proportions used in the foregoing examples. Instead of using methyldichlorosilane, one can use other organic hydrogen chlorosilanes as promoters; for instance, phenyl hydrogen dichlorosilane, dimethyl hydrogen chlorosilane, etc. It has unexpectedly been found that the choice of promotor is critical. Thus, the use of methyldichlorosilane as a promoter gives the desirable results as pointed out in the previous examples. However, if another silane containing silicon-bonded hydrogen, such as silicochloroform is employed in place of the methyldichlorosilane, larger quantities of the less desirable phenyldimethylchlorosilane are obtained. If a promoter is used, the amount employed is usually very small and ranges from about 0.001 to about 10%, by weight, based on the total weight of the organochlorosilanes undergoing redistribution.

The active redistribution catalyst in the above described reaction is zirconium tetrachloride. It will, of course, be apparent, however, to those skilled in the art that in order to carry out the reaction, one may start with either zirconium metal or a zirconium compound which, under the conditions of the reaction, is converted to the zirconium tetrachloride as a result of the presence of free chlorine derived from the alkyl chlorosilane or phenylchlorosilane (if that is used) being heated at elevated temperatures. The use of such zirconium compounds is intended to be included within the scope of the invention herein claimed.

When employing zirconium metal as a source of the zirconium tetrachloride, the yields are somewhat lower and obviously the reaction becomes more expensive due to the higher cost of the zirconium metal. The reduced yields using the zirconium metal are apparent from the following reaction which was carried out employing 33 parts triphenylmethylsilane, 72 parts methyltrichlorosilane and 5 parts methyldichlorosilane. This mixture of ingredients was heated in the presence of 2 parts zirconium metal at a temperature of about 170° C. for 4 hours under autogenous pressure in a pressure reactor. Based on the unreacted methyltrichlorosilane, there was obtained a 50 percent yield of methylphenyldichlorosilane.

Included among the zirconium compounds which, under the conditions of the reaction, are converted to zirconium tetrachloride may be mentioned, for instance, zirconium acetate, zirconium hydroxide, zirconium oxychloride, etc. The use of zirconium halides, such as zirconium tetrabromide or zirconium tetraiodide, should be avoided since not only are they more expensive than the zirconium tetrachloride, but also they introduce different halogens into the formed methylphenylchlorosilanes, causing difficulty in the separation step. This, of course, does not mean that they may not be used as the source of zirconium tetrachloride since the chlorine will replace either the bromine or the iodine in the zirconium salt of the latter two halides.

The phenylalkylchlorosilanes prepared in accordance with my invention have many uses. They can be employed for treating various solid bodies to render them water-repellent. In addition, the phenylalkylchlorosilanes can be hydrolyzed by themselves or with other organohalogenosilanes to make organopolysiloxane resins, oils and rubbers. Thus, the phenylalkylchlorosilanes (for instance, phenylmethyldichlorosilane or phenylethyldichlorosilane) may be cohydrolyzed with dimethyldichlorosilane to form an intercondensed organopolysiloxane containing phenylmethylsiloxy units and dimethylsiloxy units, which can be further condensed to high molecular weight products, which can be compounded with various fillers and curing agents such as benzoyl peroxide and heated at elevated temperatures to form cured, solid, elastic products. Such curable (i.e., vulcanizable) products have utility, for instance, as gaskets, as glass coating compositions, etc., which are to be subjected to elevated temperatures of the order of 200° to 300° C., or which are required to remain flexible at the depressed temperatures of the order of —50° to —100° C. Alternatively, the phenylalkylchlorosilanes prepared in accordance with the present invention may be cohydrolyzed with, for instance, methyltrichlorosilane, dimethyldichlorosilane, and diphenyldichlorosilane to make electrically insulating resinous compositions which can be heated in the presence of curing agents such as driers (e.g., zinc octoate, cobalt naphthenate, etc.) to give cured resinous films having good resistance to elevated temperature.

What I claim as new and desire to secure by Letters Patent of the United States is:

1. The process for preparing phenylalkylchlorosilanes which comprises effecting reaction at temperatures of from 125 to 500° C. in the presence of zirconium tetrachloride as a catalyst between (1) a preformed compound corresponding to the general formula

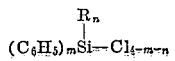

and (2) a preformed compound corresponding to the general formula $$R'_p Si Cl_{4-p}$$

where R and R' are alkyl radicals, $m$ is an integer equal to from 2 to 4, inclusive, $n$ is an integer equal to from 0 to 1, the sum of $m+n$ being at most 4, and $p$ is an integer equal to from 1 to 2, inclusive.

2. The process for making phenylmethyldichlorosilane which comprises effecting reaction at temperatures of from 125 to 500° C. in the presence of zirconium tetrachloride as a catalyst between (1) triphenylmethylsilane and (2) methyltrichlorosilane.

3. The process for making phenylmethyldichlorosilane which comprises effecting reaction at temperatures of from 125 to 500° C. in the presence of zirconium tetrachloride as a catalyst between (1) diphenylmethylchlorosilane and (2) methyltrichlorosilane.

4. The process for making phenylmethyldichlorosilane which comprises effecting reaction at temperatures of from 125 to 500° C. in the presence of zirconium tetrachloroide as a catalyst between (1) tetraphenylsilane and (2) methyltrichlorosilane.

5. The process for making phenylalkylchlorosilanes which comprises effecting reaction at temperatures above 125° C. but below the decomposition point of the reactants and reaction products in the presence of zirconium tetrachloride as a catalyst and a monomeric silane containing a silicon-bonded hydrogen atom as a promoter, between (1) a preformed compound corresponding to the general formula $$(C_6H_5)_m \overset{R_n}{\underset{|}{Si}} Cl_{4-m-n}$$

and (2) a preformed compound corresponding to the general formula $$R'_p Si Cl_{4-p}$$

where R and R' are alkyl radicals, $m$ is an integer equal to from 2 to 4, inclusive, $n$ is an integer equal to from 0 to 1, the sum of $m+n$ being at most 4, and $p$ is an integer equal to from 1 to 2, inclusive.

6. The process for making phenylmethyldichlorosilane which comprises effecting reaction at temperatures of from 125° to 500° C. in the presence of catalytic amounts of zirconium tetrachloride and in the presence of methyldichlorosilane as a promoter between (1) triphenylmethylsilane and (2) methyltrichlorosilane.

7. The process for making phenylmethyldichlorosilane which comprises effecting reaction at temperatures of from 125° to 500° C. in the presence of catalytic amounts of zirconium tetrachloride and in the presence of methyldichlorosilane as a promoter between (1) diphenylmethylchlorosilane and (2) methyltrichlorosilane.

8. The process for making phenylmethyldichlorosilane which comprises effecting reaction at temperatures of from 125° to 500° C. in the presence of catalytic amounts of zirconium tetrachloride and in the presence of methyldichlorosilane as a promoter between (1) tetraphenylsilane and (2) methyltrichlorosilane.

9. The process for preparing phenylalkylchlorosilanes which comprises effecting reaction at temperatures of from 125 to 500° C. in the presence of zirconium tetrachloride as a catalyst between (1) methyltrichlorosilane and (2) a preformed compound corresponding to the general formula $$(C_6H_5)_m \overset{R_n}{\underset{|}{Si}} Cl_{4-m-n}$$

where R is an alkyl radical, $m$ is an integer equal to from 2 to 4, inclusive, and $n$ is an integer equal to from 0 to 1, the sum of $m+n$ being at most 4.

References Cited in the file of this patent
UNITED STATES PATENTS 2,786,861    McEntee _____ Mar. 26, 1957

OTHER REFERENCES

Krishnamurti; "Jour. of Madras Univ.," 1928, 5 p. (Chem. Abstracts), vol. 23 (1929), p. 2164³.

Calingaert et al.: "Jour. Am. Chem. Soc.," vol. 61 (1939), pp. 2748–54.

Thomas: "Anhydrous Aluminum Chloride in Organic Chemistry," Reinhold Publ. Corp., New York (1941), pp. 874–5 and 877.